United States Patent [19]

Vogel et al.

[11] Patent Number: 4,490,483
[45] Date of Patent: Dec. 25, 1984

[54] PROCESS FOR PREPARING CATALYSTS

[75] Inventors: Roger F. Vogel, Butler; Raymond J. Rennard, Oakmont; Joseph A. Tabacek, New Kensington, all of Pa.

[73] Assignee: Gulf Research & Development Company, Pittsburgh, Pa.

[21] Appl. No.: 495,966

[22] Filed: May 19, 1983

[51] Int. Cl.³ .................. B01J 21/04; B01J 21/06; B01J 23/28
[52] U.S. Cl. .................. 502/309; 502/242; 502/306; 502/307; 502/308
[58] Field of Search ............ 502/308, 309, 314, 306, 502/307, 242

[56] References Cited

U.S. PATENT DOCUMENTS 2,739,132  3/1956  Riedl ................... 502/351
3,840,473  10/1974  Beuther et al. ........... 502/314

*Primary Examiner*—W. J. Shine
*Attorney, Agent, or Firm*—Deane E. Keith; Forrest D. Stine

[57] ABSTRACT

A process for preparing novel catalysts of increased activity which comprises (1) mixing alumina with at least a Group IVB metal compound and a molybdenum compound and an aqueous solution containing at least one dissolved compound therein that imparts to said aqueous solution a pH below 6 and (2) thereafter adding to the resulting product at least one metal compound not previously added thereto.

21 Claims, No Drawings

PROCESS FOR PREPARING CATALYSTS

BACKGROUND OF THE INVENTION

1. Field of the Invention

This invention relates to a novel process for preparing novel catalysts of increased activity which comprises (1) mixing alumina with at least a Group IVB metal compound and a molybdenum compound and an aqueous solution containing at least one dissolved compound therein that imparts to said aqueous solution a pH below 6 and (2) thereafter adding to the resulting product at least one metal compound not previously added thereto.

2. Description of the Prior Art

Catalysts can be prepared that are composed of an alumina support carrying metal components thereon, for example, compounds of nickel, titanium or molybdenum.

SUMMARY OF THE INVENTION

We have found that catalysts of increased activity can be prepared by (1) mixing alumina with at least a Group IVB metal compound and a molybdenum compound and an aqueous solution containing at least one dissolved compound therein that imparts to said aqueous solution a pH below 6 and (2) thereafter adding to the resulting compound at least one metal compound not previously added thereto.

In preparing the novel catalyst herein, five separate and distinct components are required in the first stage of such preparation. The first component is alumina, which will form the support portion of the novel catalyst claimed herein. Any of the known aluminas, or any aluminum compound capable of being calcined to alumina in air at a temperature of about 200° to about 1200° C. over a period of about 0.5 to about 24 hours, can be used. When an uncalcined alumina precursor is used, it is preferably selected from any of the well-known groups of hydroxides, hydrated oxides, carbonate compounds or mixtures thereof. Examples of such compounds are pseudoboehmite, boehmite, bayerite, gibbsite, nordstrandite, and ammonium aluminum carbonate hydroxide hydrate. Of these, we prefer to employ pseudoboehmite. If a precalcined alumina is used, it can be one or more of the well-known aluminas, examples of which are gamma, eta, theta, chi, alpha, delta, iota and kappa alumina. Of these, we prefer gamma and/or eta alumina. Additionally, precursors or aluminum oxides which are non-crystalline can also be utilized. In general the alumina will have an average pore radius of about 10 to about 300 Å, preferably about 20 to about 250 Å, a surface area of about 10 to about 500 m²/g, preferably about 50 to about 350 m²/g, and a pore volume of from about 0.05 to about 2.0 cc/g, preferably about 0.10 to about 1.5 cc/g, when measured by the nitrogen adsorption method (Barrett, E. P., Joyner, L. G. and Halenda, P. P., J. Am. Chem. Soc., 73, 373 (1951)).

The second and third components required in the first stage of the claimed process are a Group IVB metal compound (or mixtures thereof) and a molybdenum compound, respectively, that are to be placed on the surface of the alumina. Any of the metal oxides of a Group IVB metal and molybdenum, or compounds of Group IVB metals or molybdenum, organic or inorganic, capable of being converted to its oxide form under the calcination conditions defined above can be used. Of these we prefer to use the corresponding metallic oxides, hydroxides or hydrated oxides and carbonates of these metals. Examples of such metal compounds are:

| | |
|---|---|
| $TiO_2$, | $Zr(OC_3H_7)_4$, |
| $TiO_2 \cdot xH_2O$, | $Zr(O_2C_5H_7)_4$, |
| $Ti(OC_3H_7)_4$, | $HfO_2$, |
| $Ti(OC_4H_9)_4$, | $MoO_3$, |
| $Ti_2(C_2O_4)_3 \cdot 10H_2O$, | $(NH_4)_6Mo_7O_{24} \cdot 4H_2O$, |
| $Ti_2O_3$, | $(NH_4)_2MoO_4$, |
| $Ti_2(SO_4)_3$, | $3(NH_4)_2 \cdot 0.5MoO_3 \cdot 2MoO_4 \cdot 6H_2O$, |
| $TiOSO_4$, | $[Mo(OCOCH_3)_2]_2$, |
| $ZrO_2$, | $Mo(CO)_6$, |
| $ZrO_2 \cdot xH_2O$, | $H_3PO_4 \cdot 12MoO_3 \cdot xH_2O$, |
| $3ZrO_2 \cdot CO_2 \cdot H_2O$, | $(NH_4)_3PO_4 \cdot 12MoO_3 \cdot xH_2O$, |
| $Zr(OH)_4$, | $H_4SiO_4 \cdot 12MoO_3 \cdot xH_2O$, |
| $Zr(NO_3)_4 \cdot 5H_2O$, | $(NH_4)_4SiO_4 \cdot 12MoO_3 \cdot xH_2O$, and |
| $Zr(SO_4)_2$, | $(NH_4)_2Mo_2O_7$. |

Of these we prefer $TiO_2$ as the Group IVB metal compound and $(NH_4)_6Mo_7O_{24} \cdot 4H_2O$ as the molybdenum compound.

Also required in the first stage of the process for the preparation of the novel catalyst herein is an aqueous solution containing water, as the fourth component, and dissolved therein, as the fifth component; at least one compound sufficient to impart to said aqueous solution a pH below 6, generally in the range of about 0.1 to about 5.5, but, most preferably, from about 1.0 to about 5.0. For such use any water-soluble compound, organic or inorganic, but preferably inorganic, that can impart to said aqueous solution a pH below 6 can be used. Specific examples of such water-soluble compounds that can be used include inorganic acids, such as nitric acid, sulfuric acid, hydrofluoric acid, hydrochloric acid, phosphoric acid and boric acid, organic acids, such as acetic acid, oxalic acid, citric acid, tartaric acid and formic acid, salts, such as aluminum nitrate, aluminum chloride, aluminum sulfate, ammonium nitrate, ammonium chloride and water-soluble nitrate and chloride salts of transition metals, such as iron, chromium, copper, zinc and lanthanum. Of these we prefer the mineral acids, nitric acid and hydrochloric acid. Most preferred is aqueous nitric acid having a concentration of about five to about 90 weight percent, preferably about 10 to about 70 weight percent.

If desired, for example, to further enhance the catalytic performance of the novel catalyst herein, by, for example, increasing activity, altering selectivity or prolonging useful lifetime, we can add to the mixture obtained from a combination of the above-named five components, other metal oxide(s) or metal compounds, organic or inorganic, capable of being converted to its oxide from under the calcination conditions defined above or any ammonium compound that will decompose or volatilize under the calcination conditions defined above. Thus, this can include metal compounds whose metal portions fall within Periods 4, 5 and 6 of the Periodic Table and which are selected from the groups consisting of IIA, IIIB, and IVA of the Periodic Table and the elements Mg, V, Mn, Fe, Co, Ni, Cu, Zn, Si, Sb, Bi, Cr and W. Of these we prefer to use the corresponding metallic oxides, hydroxides or hydrated oxides and carbonates as the added optional metallic component. Specific examples of such compounds include:

Group IIA metal compounds, such as:
  $CaO$, $CaCO_3$, $SrO$ and $BaO$;

Group IIIB metal compounds such as:
  $Sc_2O_3$, $Y_2O_3$, $La_2O_3$, $Ce_2O_3$ and $CeO_2$;
Group IVA metal compounds, such as:
  $GeO_2$, $SnO_2$ and $PbO$;

Other metal compounds, such as:

| | |
|---|---|
| $Cr_2O_3$, | $CoC_2O_4$, |
| $WO_3$, | $CoSO_4$, |
| $(NH_4)_6H_2W_{12}O_{40}.xH_2O$, | $NiO$, |
| $MgO$, | $Ni(NO_3)_2.6H_2O$, |
| $V_2O_5$, | $Ni(OH)_2$, |
| $MnO_2$, | $NiCO_3$, |
| $Fe_2O_3$, | $2NiCO_3.3Ni(OH)_2.4H_2O$, |
| $CoO$, | $Ni(C_2H_3O_2)_2$, |
| $Co(NO_3)_2.6H_2O$, | $NiC_2O_4.2H_2O$, |
| $Co(OH)_2$, | $Ni(CHO_2)_2.2H_2O$, |
| $CoCO_3$, | $NiSO_4$, |
| $2CoCO_3.Co(OH)_2.H_2O$, | $CuO$, |
| $Co(C_2H_3O_2)_2.4H_2O$, | $ZnO$, |
| $Co(C_2H_3O_2)_3$, | $SiO_2$, |
| $Co(CHO_2)_2.2H_2O$, | $Sb_2O_3$, |
| $Co_2O_3.3H_2O$, | $Bi_2O_3$, | and ammonium compounds, such as ammonium hydroxide, ammonium acetate, ammonium nitrate, etc. Of these we prefer ammonium hydroxide.

The resulting mixture when the above five components are combined will contain the five components in the following amounts in weight percent:

TABLE I

| | Weight Percent | | |
|---|---|---|---|
| | Broad Range | Preferred Range | Most Preferred Range |
| Alumina | 15–70 | 20–50 | 25–40 |
| Group IVB Compound | 0.1–25 | 0.5–10 | 1–5 |
| Molybdenum Compound | 0.01–20 | 0.1–10 | 0.6–7 |
| Water | 20–75 | 30–70 | 50–60 |
| Acidic Component(s) | 0.001–10 | 0.01–2 | 0.1–0.7 |

When the optional component is added to the above five components in the mixture, the resulting mixture will contain each of the components in the following amounts in weight percent.

TABLE II

| | Weight Percent | | |
|---|---|---|---|
| | Broad Range | Preferred Range | Most Preferred Range |
| Alumina | 15–70 | 20–50 | 25–40 |
| Group IVB Compound | 0.1–25 | 0.5–10 | 1–5 |
| Molybdenum Compound | 0.01–20 | 0.1–10 | 0.6–7 |
| Water | 20–75 | 30–70 | 50–60 |
| Acidic Component(s) | 0.001–10 | 0.01–2 | 0.1–0.7 |
| Optional Component(s) | 0.01–20 | 0.1–10 | 0.5–5 |

The mixtures defined above are preferably obtained by intimately mixing together, in any desired manner, the five or more components defined above until a substantially homogeneous entity is obtained. In an especially preferred embodiment, the alumina and the metallic component or components are first brought together and mixed, after which they are then further mixed with the aqueous solution of desired pH and then finally a combination of the molybdenum compound and optional component in a common aqueous solution are thoroughly blended with the mixture. The resulting paste, or slurry, can then be formed into any desired shape following any desired or conventional procedure to obtain extrudates or spheres, or the mixture can be spray-dried to obtain a fluid catalyst. Following this, the formed entity can be dried, for example, at a temperature of about 100° to about 200° C. to remove water therefrom, and then, optionally, calcined in air at any suitable temperature, for example, in the range of about 200° to about 1200° C., preferably from about 300° to about 800° C., for about 0.5 to about 24 hours, preferably for about two to about 20 hours.

The resulting product, composed of alumina carrying the metallic components thereon can then be treated in the second stage of the process for the purpose of adding thereon one or more catalytic components, for example, by impregnation or mix-mulling followed by, if desired and/or required, drying and calcining as defined above at the end of the first stage. The additional components that can be so added in the second stage can be one or more of the metallic components previously listed as being suitable for use in the first stage but which had not been previously used. Of these, we prefer to use nickel and/or cobalt compounds, especially nickel nitrate.

The selection of the method of additional component addition, for example, nickel nitrate or nickel carbonate, is based upon the characteristics of the added catalyst material, the nature of the desired additional component and the intended process application. For fixed-bed catalysis utilizing extrudates or other formed particles, incipient wetness (no excess solution) impregnation is the preferred procedure. The solution employed is preferably aqueous, and any combination of mutually-soluble components can be added to the catalyst by way of the solution prior to the additional drying and calcining, if used, as defined in the first stage above.

When the catalyst prepared from the five or more components has not been formed into particles, such as extrudates, then other methods of additional component blending, in addition to impregnation, can be utilized. Such methods include mix-mulling and compositing. These methods are used primarily to add insoluble components to a fluid or finely-divided catalyst. Mix-mulling implies the use of a liquid to aid in the mixing and blending of two or more solid materials. The resulting blend can be formed as described above into extrudates, spheres, etc., or additional solution can be added to form a pumpable slurry for purposes of spray drying. Compositing implies a dry mixing of two or more components. The mixture can then be formed into tablets, or a liquid can be added thereto to facilitate formation by extrusion, spheronization, etc., or a slurry can be formed to facilitate spray drying.

The addition of other components in the second stage can be done in any convenient manner, examples of which are set forth in below.

(1) Calcined extrudates can be impregnated with compounds dissolved in solution using the well-known incipient wetness (no excess solution) method. Compounds can be added in a single step wherein one or more compounds are dissolved in solution and simultaneously added to the catalyst, followed by drying and calcination. If desired, several steps can be employed with intermediate heat treatments. Thus, a procedure utilizing impregnation techniques would be to use extrudates prepared by blending alumina precursor, $TiO_2$, an aqueous solution of nitric acid, and ammonium molybdate dissolved in a mixture of water and ammonium hydroxide, followed by extrusion, drying and calcination. These extrudates can then be impregnated with an aqueous solution of nickel nitrate hexahydrate, followed by drying and calcination. The resulting catalyst will contain nickel, titanium and molybdenum as oxides and alumina.

(2) The method of mix-mulling can be used when aggregates, such as extrudates, are not formed from the initial mixture. For instance, a catalyst resulting from the blending of alumina precursor, titania, an aqueous solution of nitric acid, and ammonium molybdate dissolved in a mixture of water and ammonium hydroxide can be dried, calcined and sized to 100-200 mesh particles. This catalyst can be dry blended with nickel carbonate and sufficient water to form a paste, and the resulting combination can be thoroughly mix-mulled, after which the catalyst is dried, calcined, sized to 100-200 mesh and then tabletted to obtain a catalyst containing nickel, titanium and molybdenum as oxides and alumina.

(3) A composite catalyst can be prepared by first blending alumina precursor, titania, an aqueous solution of nitric acid, and ammonium molybdate dissolved in a mixture of water and ammonium hydroxide, drying, calcining and sizing to 100-200 mesh particles. This catalysts can be blended with nickel oxide and tabletted, then dried and calcined to form a catalyst containing nickel, titanium and molybdenum as oxides and alumina.

DESCRIPTION OF PREFERRED EMBODIMENTS

EXAMPLE I 680.7 grams of Harshaw alumina, Al 4100P, containing 73.4 weight percent of $Al_2O_3$, and 55 grams of $TiO_2$ were dry mixed and the resulting mixture was further mixed with a solution consisting of 5.6 grams of 70 weight percent aqueous nitric acid that had been diluted with water to a total volume of 500 ml. The total amount of water thus present was 494 ml and the pH of the aqueous solution prior to mixing was 2.2. The components were mixed over a period of one hour to obtain a paste. The paste so obtained was further mixed with an aqueous solution containing 95.8 grams of dissolved ammonium para molybdate, 42 ml of ammonium hydroxide and 127 ml of water. The resultant mixture was then converted to 1/16" (1.6 mm) extrudates, which were then dried at 120° C. over a period of 20 hours and calcined in air at 700° C. over a period of 10 hours. A portion of these extrudates which contained 90.9 grams of $Al_2O_3$ was weighed out and impregnated with a solution prepared by dissolving 17.8 grams of $Ni(NO_3)_2.6H_2O$ in water to a total volume of 116 ml. Following impregnation the extrudates were dried at 120° C. over a period of 20 hours and then calcined at 550° C. over a period of 10 hours. The resulting catalyst was sized to 16-30 mesh. The amounts of materials used and the conditions employed are further set forth below in Table IV.

EXAMPLE II

The procedure of Example I was repeated, except that 11.1 grams of 70 weight percent aqueous nitric acid was used. The amounts of materials used and conditions employed are further set forth below in Table IV.

EXAMPLE III

The procedure of Example I was repeated except that 3.3 grams of 38 weight percent HCl was used in place of nitric acid. The amounts of materials used and conditions employed are further set forth below in Table IV.

EXAMPLE IV

The procedure of Example I was again repeated except that methyl cellulose was dry-blended with the alumina and titania. No acidic component was added to the water. The amounts of materials and conditions employed are further set forth below in Table IV.

Each of the catalysts prepared above contained three weight percent nickel metal, five weight percent titanium metal, and eight weight percent molybdenum metal present as oxides and supported on the $Al_2O_3$.

Each of the catalysts prepared above was tested for its catalytic activity as follows: In each case 102 ml of the catalyst was charged to the reactor, after which the reactor was purged with one standard cubic foot (0.028 cubic meter)/hour of nitrogen at atmospheric pressure and 149° C. for 30 minutes. The catalyst was further pretreated with a distillate, spiked with 2000 ppm of sulfur as $CS_2$, which was introduced into the reactor at a flow rate of 102 ml per hour and a temperature of 149° C. Hydrogen was then introduced at a flow rate of 0.358 standard cubic feet (0.01 cubic meter) per hour and 200 psig (1379 kPa). The temperature was then raised at the rate of 26° C. per hour to 204° C. The pretreatment lasted for a period of 12 hours. After pretreatment, the distillate flow was stopped and the feedstock was begun at 204° C. and a charge rate of 61 ml per hour. The hydrogen feed rate was thereupon increased to 1.54 standard cubic feet (0.044 cubic meter) per hour and 2000 psig (13,790 kPa). Over a period of one hour the temperature was raised to 360° C. and the run was begun. The feedstock consisted of Kuwait first-stage HDS product containing 1 weight percent sulfur spiked with 1500 ppm sulfur as $CS_2$. Properties of the feedstock are defined below in Table III.

TABLE III

| Feedstock Properties | |
|---|---|
| Gravity, °API | 19.9 |
| Sulfur, Wt % | 1.00 |
| V, ppm | 21 |
| Ni, ppm | 10 |
| Distillation, D 1160 | |
| 5% over at °F. (°C.) | 551 (288) |
| 10% over at °F. (°C.) | 703 (373) |
| 20% over at °F. (°C.) | 763 (406) |
| 30% over at °F. (°C.) | 817 (436) |
| 40% over at °F. (°C.) | 861 (461) |
| 50% over at °F. (°C.) | 910 (488) |
| 60% over at °F. (°C.) | 966 (519) |
| 70% over at °F. (°C.) | 1013 (545) |
| 80% over at °F. (°C.) | cracked at 70% |

The product was collected every four hours and analyzed for sulfur. The activity data obtained, presented below in Table IV, are an average for 36- and 40-hour periods. Catalyst activity was defined as follows:

$$\text{Wt \% Hydrodesulfurization} = \frac{S_o - S}{S_o} \times 100\%$$

wherein $S_o$ and $S$ are the feedstock and product sulfur respectively.

TABLE IV

| Example No. | I | II | III | IV |
|---|---|---|---|---|
| Initial Treatment | | | | |
| Al 4100P, g., | 680.7 | 680.7 | 408.8 | 408.8 |
| $TiO_2$, g. | 55.0 | 55.0 | 33.0 | 33.0 |
| Nitric Acid, g. | 5.6 | 11.1 | None | None |
| Hydrochloric Acid, g. | None | None | 3.3 | None |
| Methyl Cellulose, g. | None | None | None | 3.25 |
| Ammonium Para Molybdate, g. | 95.8 | 95.8 | 57.0 | 57.0 |
| Water, ml. | 622 | 618 | 399 | 400 |
| Ammonium Hydroxide, ml | 42 | 42 | 25 | 25 |
| pH of Aqueous Solution | 2.2 | 1.6 | 2.2 | 6.4 |
| Subsequent Treatment | | | | |
| Wt of $Al_2O_3$ In Extrudate, g. | 90.9 | 82.0 | 93.2 | 102 |
| $Ni(NO_3)_2 \cdot 6H_2O$, g., | 17.8 | 16.1 | 18.3 | 20.1 |
| Vol. of Impregnation Solution, ml. | 116 | 87 | 135 | 137 |
| Activity, % Hydrodesulfurization | 61.6 | 61.0 | 60.4 | 59.6 |

The unexpected advantages resulting from the process defined and claimed herein are apparent from the data in Table IV above. In each of Examples Nos. I and II wherein the pH of the aqueous solution was maintained below 6, namely 2.2 and 1.6, respectively, using nitric acid therefor, the percent hydrodesulfurization was 61.6 and 61.0, respectively. Example No. III clearly illustrates that hydrochloric acid as well as nitric acid can be used to impart a pH below 6 to the aqueous solution being used in the preparation of the catalyst. The failure to use such an aqueous solution in the preparation of the catalyst in Example No. IV resulted in a catalyst of reduced activity.

Obviously, many modifications and variations of the invention, as hereinabove set forth, can be made without departing from the spirit and scope thereof, and therefore only such limitations should be imposed as are indicated in the appended claims.

We claim:

1. A process for preparing catalysts of increased activity which comprises (1) in a first stage mixing alumina with at least a Group IVB metal compound selected from the group consisting of $TiO_2$, $TiO_2 \cdot xH_2O$, $TiO_2$, $ZrO_2$, $ZrO_2 \cdot xH_2O$, and $HfO_2$ and a molybdenum compound in an aqueous solution containing at least one dissolved compound therein that imparts to said aqueous solution a pH below 6 so as to place said Group IVB metal compound and said molybdenum compound on the surface of said alumina, the resultant product containing from 20 to 50 weight percent alumina, 0.5 to 10 weight percent of said Group IVB metal compound, 0.1 to 10 weight percent of said molybdenum compound and 0.01 to 2 weight percent of said dissolved compound, drying and calcining the resultant product and (2) thereafter in a second stage adding to the resultant product a solution of at least one water soluble metal salt wherein the metal of said salt is selected from Groups IIA, IIIB and IVA of the Periodic Table, the metals V, Mn, Fe, Co, Ni, Cu, Zn, Sb, Bi, Cr and W, and the element Si drying and calcining the product of the second stage.

2. The process of claim 1 wherein the pH of said aqueous solution is in the range of about 0.1 to about 5.5.

3. The process of claim 1 wherein the pH of said aqueous solution is in the range of about 1.0 to about 5.0.

4. The process of claim 1 wherein said dissolved compound is an inorganic acid.

5. The process of claim 4 wherein said inorganic acid is nitric acid.

6. The process of claim 4 wherein said inorganic acid is hydrochloric acid.

7. The process of claim 1 wherein said Group IVB metal compound is a titanium compound.

8. The process of claim 1 wherein said Group IVB metal compound is a zirconium compound.

9. The process of claim 1 wherein said titanium compound is $TiO_2$.

10. The process of claim 1 wherein said molybdenum compound is ammonium para molybdate.

11. The process of claim 1 wherein said molybdenum compound is $MoO_3$.

12. The process of claim 1 wherein the components used in the first stage fall within the following ranges:

| | Weight Percent |
|---|---|
| Alumina | 25–40 |
| Group IVB Compound | 1–5 |
| Molybdenum Compound | 0.6–7 |
| Water | 50–60 |
| Acidic Component(s) | 0.1–0.7 |

13. The process of claim 1 wherein the product from the first stage is dried and then calcined in air at a temperature of about 200° to about 1200° C.

14. The process of claim 1 wherein the product from the first stage is dried and then calcined in air at a temperature of about 300° to about 800° C.

15. The process of claim 1 wherein said water soluble metal salt added in said second stage is selected from the group consisting of nickel and cobalt compounds.

16. The process of claim 1 wherein said water soluble metal salt added in said second stage is a nickel compound.

17. The process of claim 16 wherein said nickel compound is nickel nitrate.

18. The process of claim 16 wherein said nickel compound is nickel oxide.

19. The process of claim 1 wherein the product at the end of the second stage is dried and then calcined in air at a temperature of about 200° to about 1200° C.

20. The process of claim 1 wherein the product at the end of the second stage is dried and then calcined in air at a temperature of about 300° to about 800° C.

21. The process of claim 1 wherein a titanium compound and a molybdenum compound are added in the first stage, the resulting product is dried and then calcined in air at a temperature of about 200° to about 1200° C., a nickel compound is then added to the calcined product, followed by further drying and calcining in air at a temperature of about 200° to about 1200° C.

* * * * *